United States Patent [19]
Manabe et al.
[11] 4,104,432
[45] Aug. 1, 1978

[54] PLASTIC ARTICLES HAVING ON THE SURFACE THEREOF A PROTECTED METAL FILM

[75] Inventors: Katsuhide Manabe, Ichinomiya; Jiro Masumi, Aichi; Tomotada Tochitani, Ichinomiya; Kenzo Shinoda, Gifu, all of Japan

[73] Assignee: Toyoda Gosei Kabushiki-Kaisha (Toyoda Synthetics Co., Ltd.), Japan

[21] Appl. No.: 700,117

[22] Filed: Jun. 28, 1976

[30] Foreign Application Priority Data

Jun. 30, 1975 [JP] Japan ........................ 50-80074

[51] Int. Cl.[2] ........................ B32B 15/08

[52] U.S. Cl. ........................ 428/216; 427/54; 427/404; 428/335; 428/336; 428/339; 428/423; 428/424; 428/458; 428/461; 428/483

[58] Field of Search ........................ 428/31, 332, 336, 339, 428/423, 424, 457, 458, 461, 480, 483, 500, 913, 213, 215, 216, 334, 335; 427/54, 404, 407, 409

[56] References Cited

U.S. PATENT DOCUMENTS

| | | | |
|---|---|---|---|
| 3,152,950 | 10/1964 | Palmquist et al. | 428/31 X |
| 3,437,514 | 4/1969 | Burlant | 427/44 |
| 3,681,180 | 8/1972 | Kent | 428/461 X |
| 3,811,989 | 5/1974 | Hearn | 428/461 X |
| 3,991,230 | 11/1976 | Dickie et al. | 427/44 |

*Primary Examiner*—George F. Lesmes
*Assistant Examiner*—Bruce H. Hess
*Attorney, Agent, or Firm*—William J. Daniel

[57] ABSTRACT

Molded plastic articles having on the surface thereof a thin metal film coated in any order of succession with protective layers of (a) a coat derived from 100 parts by weight of an acrylic copolymer having a hydroxyl number of 10–150, 10–150 parts by weight of an anti-yellowing polyisocyanate and 2–10 parts by weight of an ultraviolet rays-absorbing agent and (b) a coat cured by the action of ultraviolet rays. Such molded plastic articles having on the surface thereof a metal film coated with the protective layers are manufactured by (1) covering the metal film with a paint comprising 100 parts by weight of an acrylic copolymer having a hydroxyl number of 10–150, 10–150 parts by weight of an anti-yellowing polyisocyanate and 2–10 parts by weight of an ultraviolet rays-absorbing agent and curing the paint by heating and then (2) covering the cured coat with a paint curable by the action of ultraviolet rays and curing the latter paint by irradiation of ultraviolet rays or alternatively by effecting the treatment (1) after completion of the treatment (2).

8 Claims, No Drawings

PLASTIC ARTICLES HAVING ON THE SURFACE THEREOF A PROTECTED METAL FILM

BACKGROUND OF THE INVENTION

The present invention relates to molded plastic articles having a protected metal film on the surface thereof and to a process for manufacturing same. More particularly, the present invention relates to molded plastic articles having on the surface thereof a thin metal film formed by vacuum evaporation and coated with a combination of specific protective layers and to a process for manufacturing such molded plastic articles.

The best way to imparting metallic appearance and feeling to plastics is to form a metal film on the surface of the plastics. Known hitherto as means for forming such metal film on the surface of plastics are vacuum-evaporation, hot stamping and electroplating. Besides these, such methods as low temperature spattering, ion plating and spray-plating are also being put into practice. However, all of these methods involve problems in their operations and in the properties of the resultant products and are hardly said to be satisfactory for forming a metal film on the surface of plastics.

Among these methods the one capable of producing the products having a metal film most strongly attached thereto comprises providing the surface of plastic articles with a chemical plating and then subjecting the chemically plated surface to an electroplating treatment with a metal or alloy such as copper, nickel or chromium. However, this method is economically unattractive in view of its complicacy in operations and has many drawbacks including troublesome treatments of a waste electroplating liquid which often incurs environmental pollution. A metal film formed by any of the other methods is extremely thin, i.e. within a range from several thousand angstroms to several microns and is weak in intermetallic binding force. Thus, such a thin metal film is extremely poor in resistant properties such as abrasion-resistance and weathering-resistance. In the conventional arts, therefore, the surface of a metal-plated or -coated product should be provided with a protective film, for example, by applying a coating paint onto the surface.

For example, in the case of the method utilizing vacuum evaporation generally adopted among these methods for forming a metal film on the surface of plastic articles, products aimed at are produced usually by applying an under paint (called "base coat") onto the surface of molded plastic articles, drying the under paint, applying a metal such as aluminum onto the dried paint surface by vacuum evaporation and then applying a covering paint (called "top coat") functioning as a protective layer onto the surface of the metal film. However, the metal-coated plastic articles obtained according to this method are poor in weather-resisting property and are unsuited for outdoor uses because they undergo degradative ageing or permit peeling of the top coat followed by discoloration or corrosion of the metal film when used outdoors and exposed under various weathering conditions including raining and irradiation of sun beams. At the present time, therefore, the use of the products obtained according to this method are limited exclusively to indoor objects. Especially in the case of thermoplastic plastics for which a limitation exists in the treatment temperature, a paint of excellent performance which requires baking at a high temperature cannot be used. Further, protecting paints utilizable in this case will considerably be limited if their cohesiveness to the metal film is taken into account.

It follows from this that even in the case of producing thermoplastic plastics having a metal film on the surface thereof by means of vacuum evaporation, such plastic products fail to withstand outdoor uses exposed to severe weathering actions. In order to obtain plastic articles having on the surface thereof a metal film tolerant to outdoor uses, there is no way but to manufacture such plastic articles by means of electroplating or painting of a plastic article with a metal or by imbedding in a plastic article a metal film formed by vacuum evaporation and then coated with polyvinyl chloride or an acrylic resin or by providing the reverse side of a plastic article with a metal film by vacuum evaporation or cohesion. However, these methods not only entail high cost but also are disadvantageous in that they make it difficult to select the tint of the products freely and a considerable limitation exists in the aspect of the design of the products. Hence, there is a great demand for developing plastic articles having on the surface thereof a metal film tolerant to outdoor uses.

BRIEF SUMMARY OF THE INVENTION

Accordingly, it is an object of the present invention to provide plastic articles having on the surface thereof a metal film coated with protective layers.

It is another object of the present invention to provide weather-resisting plastic articles of metallic feeling having freely selected design and tint.

It is still another object of the present invention to provide molded plastic articles having on the surface thereof a thin metal film formed by means of vacuum evaporation and coated with protective layers making the film tolerant to outdoor uses.

It is further object of the present invention to provide a process for manufacturing plastic articles having on the surface thereof a metal film coated with the protective layers.

Other and further objects, features and advantages of the present invention will become apparent more fully from the following description.

DETAILED DESCRIPTION OF THE INVENTION

As a result of much researches made on various kinds of paints applicable to plastics and metal films and on the methods of drying and curing such paints, it has now been found that a combination of specific paints imparts excellent weather-resisting property and other useful physical porperties such as abrasion-resistance to plastics having on the surface thereof a metal film formed, for example, by vacuum evaporation of metal. The present invention has been accomplished on the basis of the above finding.

In accordance with one aspect of the present invention, there is provided molded plastic articles having on the surface thereof a thin metal film coated in any order of succession with protective layers of (a) a coat derived from 100 parts by weight of an acrylic copolymer having a hydroxyl number of 10–150, 10–150 parts by weight of an anti-yellowing polyisocyanate and 2–10 parts by weight of an ultraviolet rays-absorbing agent and (b) a coat cured by the action of ultraviolet rays.

Such molded plastic articles are manufactured by applying the protective layers (a) and (b) in any order of succession onto a thin metal film covering a molded plastic article.

In accordance with the other aspect of the present invention, there is also provided a process for manufacturing molded plastic articles having on the surface thereof a thin metal film coated with protective layers, characterized by (1) covering a metal film on the surface of a molded plastic article with a paint comprising 100 parts by weight of an acrylic copolymer having a hydroxyl number of 10–150, 10–150 parts by weight of an anti-yellowing polyisocyanate and 2–10 parts by weight of an ultraviolet rays-absorbing agent and curing the paint by heating and then (2) covering the cured coat with a paint curable by the action of ultraviolet rays and curing the latter paint by irradiation of ultraviolet rays, or alternatively, by effecting the treatment (1) after completion of the treatment (2).

Plastic articles used in the present invention are usually molded to have an appropriate shape according to the intended purpose and are provided on the surface thereof with a metal film by a suitable conventional means such as vacuum evaporation or plating. Examples of plastic substances utilizable for manufacturing the molded plastic articles include various plastic resins such as ABS resin, styrene resins, vinyl chloride resins, acrylic resins, polyolefins such as polyethylene and polypropylene subjected to a surface activation treatment, FRP, polyamides and polyesters.

In case a thin metal film is formed on the surface of a molded plastic article by means of a conventional vacuum evaporation treatment, a base coat such as an urethane paint (an urethane paint of one component system or two component system, whichever is adequate) is first applied onto the surface of the molded plastic article and then cured. A thin metal film is then formed on the surface of the cured base coat by means of vacuum evaporation.

In view of similarity in mechanism, "spattering" and "ion plating" are often involved in the term "vacuum evaporation" in a broader sense of the meaning. Accordingly, the term "vacuum evaporation" is used herein to mean "spattering" or "ion plating" in addition to the inherent meaning of "vacuum evaporation". These treatments are easily operable in the manner known per se among those skilled in the art.

The formation of a thin metal film on the surface of plastic articles can be attained by other methods, for example, by means of electroplating, hot-stamping or spray-plating. In general, a relatively thick metal film cannot be formed by spattering but a significantly thick metal film can be obtained, for example, by electroplating. The thickness of a metal film formed on the surface of plastic articles varies according to the method adopted and the intended purpose of the product but is usually within a range of 0.03–10 μ (300–100000 Å), preferably 0.05–1 μ (500–100000 Å). The thickness of a metal film may be defined by the weight of the metal per unit area of the metal film, for example, in terms of micrograms of the metal per square centimeter of the metal film .

A combination of specific protective layers is then applied according to the process of the present invention onto the surface of the metal film to furnish it with excellent resisting properties to abrasion and weathering actions. The thin metal film is first coated with a paint (middle coat) composed of 100 parts by weight of an acrylic copolymer having a hydroxyl number of 10–150, 10–150 parts by weight of an anti-yellowing polyisocyanate and 2–10 parts by weight of an ultraviolet rays-absorbing agent. This paint is then cured by heating and is further coated with a paint (top coat) curable by the action of ultraviolet rays. The plastic article thus treated is finally subjected to irradiation of ultraviolet rays whereby the product having on the surface thereof a thin metal film coated with a combination of the specific protective layers are obtained.

Application of the base coat, middle coat and top coat is performed according to a conventional coating method, for example, by means of spray coating, flow coating or dipping. It is also possible to use a combination of these coating methods.

On application of the middle or top coat according to the process of the present invention, the thickness of each coat is usually adjusted within a range from 5 μ to 60 μ, preferably within a range from 10 μ to 30 μ. The thickness of each coat may properly be adjusted according to the properties required for the intended purpose of the product. In case the product is intended for outdoor uses, the thickness of each coat is desirably to at least 10 μ to furnish the metal film with a satisfactory weather-resisting property.

In this process, the treatment for curing the base coat is carried out by heating a plastic article coated with the base coat at a temperature sufficient enough to effect curing of the coat but lower than the deformation temperature of the plastic articles, for example, in a curing furnace of any suitable type. The treatment for curing the middle coat is carried out also in a similar curing furnace at a temperature lower than the deformation temperature of the plastic substrate until the middle coat is cured or half-cured. The treatment for curing the top coat is then carried out in an ultraviolet rays-irradiating furnace. These furnaces are properly selected from various commercially available ones.

Depending on the properties required for the final product for a particular purpose, the top coat and the middle coat used in the above process may be replaced with each other. In this case, the order of forming the protective layers on the surface of the metal film becomes reverse to the above case and a paint curable by the action of ultraviolet rays is first applied onto the surface of the metal film and a paint comprised of the acrylic copolymer, the anti-yellowing polyisocyanate and the ultraviolet rays-absorbing agent is then applied as the top coat, after curing of the middle coat onto the surface thereof according to the alternative variant of the process of this invention. For example, when weather-resisting property is important rather than abrasion-resisting property in the end product, the treatment (2) is preferably carried out first and then the treatment (1) is carried out according to the alternative variant of the process of this invention.

The acrylic copolymer used in one of the paints has hydroxyl groups corresponding to a hydroxyl number of 10–150 and reacts on curing with the anti-yellowing polyisocyanate. Such acrylic copolymer is a copolymer of a lower alkyl ester of acrylic and/or methacrylic acid and a lower hydroxyalkyl ester of acrylic and/or methacrylic acid and can easily be prepared according to a method known per se for polymerization. Examples of the lower alkyl acrylate and methacrylate include methyl acrylate, methyl methacrylate, ethyl acrylate, ethyl methacrylate, propyl acrylate, propyl methacrylate, n-butyl acrylate and n-butyl methacrylate. Examples of the lower hydroxyalkyl acrylate and methacrylate include 2-hydroxyethyl acrylate, 2-hydroxyethyl methacrylate, 2-hydroxypropyl acrylate, 2-hydroxypropyl methacrylate and 4-hydroxybutyl methacrylate.

In this case, the lower alkyl ester component may be a mixture of at least two lower alkyl esters and the lower hydroxyalkyl ester component may also be a mixture of at least two lower hydroxyalkyl esters. The proportion of the lower alkyl acrylate or methacrylate to the lower hydroxyalkyl acrylate or methacrylate is varied from 7:1 to 20:1 so as to obtain the copolymer having the desired hydroxyl number. A preferable acrylic copolymer is a copolymer derived from methyl methacrylate or n-butyl methacrylate and 2-hydroxyethyl and/or 2-hydroxypropyl methacrylate.

If the hydroxyl number of the acrylic copolymer is less than 10, cohesiveness of the coat to the metal film will badly be influenced. On the other hand, if the hydroxyl number exceeds 150, cohesiveness to the metal film or the cured state of the coat will become inferior. In the present invention, therefore, the hydroxyl number of the acrylic copolymer is limited to a range from 10 to 150.

By the term "anti-yellowing polyisocyanate" is meant a polyisocyanate which shows no distinct yellowing phenomenon even after the lapse of a long period of time. If a distinct yellowing phenomenon takes place gradually in the coat, the metallic luster of the metal film and transparency of the protective layers will seriously be affected after a certain period of time. In general, such anti-yellowing polyisocyanate has neither unsaturated double bond nor color-forming group in the molecule. In this case, double bonds of aromatic nature are not regarded as "unsaturated double bond" referred to herein. The color-forming group means a strong chromophore such as an azo group or a quinone structure.

Typical examples of the anti-yellowing polyisocyanate include aliphatic diisocyanate such as 1,6-hexamethylene diisocyanate, aromatic diisocyanates such as 1,5-naphthalene diisocyanate, araliphatic diisocyanates such as xylylene diisocyanate, and cycloaliphatic diisocyanates such as those of isophorone series. These anti-yellowing polyisocyanates are commercially available and may be used singly or as a mixture of at least two.

If the relative amount of the anti-yellowing polyisocyanate to the acrylic copolymer is less than 10 parts by weight, the useful properties of the resultant cured coat will be more or less deteriorated and cohesiveness to the other coat will also be deteriorated. On the other hand, if the relative amount of the anti-yellowing polyisocyanate to the acrylic copolymer is more than 150 parts by weight, curing of the paint by heating will not sufficiently be attained, thus imparting undesirable effects to the useful properties of the coat. Taking the above situation into consideration, the amount of the anti-yellowing polyisocyanate is necessarily limited to 10–150 parts by weight per 100 parts by weight of the acrylic copolymer.

The ultraviolet rays-absorbing agent (UV-absorbing agent or compound) is preferably the one having one or more hydroxy groups in the molecule. Such compound is commercially available or can easily be prepared according to the method known per se. This compound can also be used alone or in the form of a mixture of at least two. The main function of this compound is of course to absorb ultraviolet rays or the like actinic light to enhance weather-resisting property, especially resistance to degradation by sunlight of the coat.

Illustrative of the hydroxy group-containing UV-absorbing agent are, for example, 2-(2'-hydroxy-3,5-di-tert-butylphenyl)-5-chlorobenzotriazole, 2-(2'-hydroxy-5'-methylphenyl)benzotriazole, 2-(3',5'-di-tert-butyl-2-hydroxyphenyl)benzotriazole, 2-(3'-5'-alkyl2'-hydroxyphenyl)benzotriazole, tetrakis-[methylene-(3',5'-di-tert-butyl-4-hydroxyhydrocinnamate)]methane, octadecyl-3-(3',5'-di-tert-butyl-4'-hydroxyphenyl)propionate, and 2,2'-thiodiethyl-bis-[3-(3,5-di-tert-butyl-4-hydroxyphenyl)]propionate.

In the case of using the hydroxyl group-containing UV-absorbing agent, one or more hydroxyl groups contained in the molecule are partially reacted with isocyanate groups contained in the polyisocyanate whereby flexibility is imparted to the resultant coat, thus serving to improve the useful properties of the product. For example, the following table shows increase in elongation of the coat observed in the case of using an UV-absorbing agent of benzotriazole series (trade name "Tinuvin 328" marked by Ciba-Geigy, Switzerland) of the general formula:

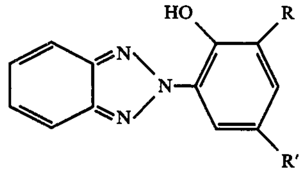

(I)

wherein R and R' each stand for an alkyl group.

TABLE

| | | | | | |
|---|---|---|---|---|---|
| Quantity of the UV-absorbing agent added (%) | 0 | 0.5 | 1.0 | 2.0 | 10.0 |
| Elongation (%) | 9 | 20 | 26 | 40 | 50 |

Furthermore, the use of such UV-absorbing agent serves to improve remarkably the weather-resisting property of the protective layers in the product. For example, the use of an UV-absorbing agent of the formula:

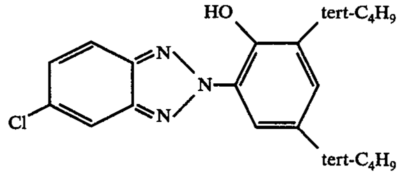

(II)

in an amount of 7% by weight based on the vehicle used brings about a 200 hour extension of time in the examination of weather-resisting property where a sunshine weather-o-meter is used, as compared with the case of using no UV-absorbing agent. Thus, the ultraviolet ray-absorbing agent is used generally in an amount of 2–10 parts by weight per 100 parts by weight of the acrylic copolymer. If the amount of the UV-absorbing agent is less than 2 parts by weight, the effect for improving flexibility and weather-resisting property is not sufficient as seen, for example, in the above table. The effect of the UV-absorbing agent increases in proportion to the amount thereof. In case the amount of the UV-absorbing agent exceeds 10 parts by weight, however, a part of the agent will ooze out on the surface of the coat and, accordingly, transparency of the coat will be damaged. As the UV-absorbing agent is generally solid and has a relatively poor solubility in a vehicle which is a good solvent for the acrylic copolymer and the polyisocyanate, the maximum amount of the UV-absorbing agent used is limited also in this respect. If a solvent is used as a vehicle for the paint, the UV-absorbing agent is usually employed in an amount up to about 1–10% by weight, preferably 3–7% by weight based on the vehicle used. The amount of the UV-absorbing agent used in the paint can suitably be varied within the above range according to the properties of the product desired for the intended purpose.

The paint curable by the action of ultraviolet rays is an unsaturated polyester polymerizable by the action of ultraviolet rays, which may usually be incorporated with one or more resin-forming materials.

The UV-polymerizable unsaturated polyester is derived by polycondensation from an unsaturated polycarboxylic acid and an alkylene glycol or from a saturated polycarboxylic acid and an alkenylene glycol. For economical reasons, such unsaturated polyester is preferably derived from an unsaturated polycaroxylic acid and a saturated alkylene glycol according to a manner known per se for polycondensation. Illustrative of the unsaturated polycarboxylic acid are fumaric acid, maleic acid and itaconic acid. Typical examples of the saturated and unsaturated alkylene glycol are straight or branched chain lower alkylene or alkenylene glycols such as ethylene glycol, propylene glycol, diethylene glycol, dipropylene glycol and 2-butene-1,2-diol. A part of the unsaturated polycarboxylic acid, for example, maleic acid may be replaced by a saturated polycarboxylic acid such as isophthalic acid or adipic acid. The above mentioned glycols may be used singly or as a mixture of at least two. The polycondensation reaction between the polycarboxylic acid and the glycol is carried out according to a usual manner by reacting the polycarboxylic acid in the form of an anhydride thereof with the glycol in the presence of an esterifying catalyst or by transesterification of a low alkyl ester of the polycarboxylic acid with the glycol. Examples of the resin-forming material which may be incorporated into the polyester include the anti-yellowing polyisocyanate and a monomer radical-copolymerizable with the UV-polymerizable unsaturated polyester, such as styrene or divinylbenzene.

A preferable example of the paint curable by the action of ultraviolet rays is a mixture of 100 parts by weight of an UV-polymerizable unsaturated polyester of the above mentioned type and 10-80 parts by weight of the anti-yellowing polyisocyanate. The use of this preferable paint as top coat brings about very good cohesion to the middle coat obtained by curing a paint comprised of the acrylic copolymer, the anti-yellowing polyisocyanate and the ultraviolet rays-absorbing agent. When the unsaturated polyester is polymerized according to a radical reaction between the double bonds initiated by the action of ultraviolet rays, the isocyanate groups of the polyisocyanate existing in the reaction system are reacted with the carboxyl groups and the hydroxyl groups in the unsaturated polyester and also with free hydroxyl groups in the cured or half-cured middle coat whereupon a cured filmy coat having a network structure of developed three dimensional linkages is formed in the top coat and integrally between the middle coat and the top coat. As the cured protective layers thus obtained has many strongly combined three dimensional linkages, the resultant product is excellent in various useful properties such as weather-resisting property, abrasion-resisting property and chemicals-resisting property. Thus, the product of the present invention wherein the metal film is fully covered with a combination of the specific protective layers is satisfactorily tolerant to outdoor applications exposed under severe weathering conditions.

In case the polymerization of a monomer used in the paint curable by the action of ultraviolet rays is hardly initiated or promoted by irradiation of ultraviolet rays in an appropriate dose permitted for curing the paint without causing any deterioration thereof, an appropriate amount of a sensitizer may be incorporated into the paint curable by the action of ultraviolet rays for the purpose of promoting the radical polymerization reaction. Typical examples of such sensitizer include benzoin methyl ether, benzophenone and diacetylthionine. These compounds can be used singly or as a mixture of at least two. These compounds and their properties are widely known in the field of photopolymerization.

If the product having colored protective layers on the surface of the metal film is desired, either or both of the paints may be incorporated with one or more coloring agents such as dyes and pigments. These coloring agents should preferably possess satisfactory fastness to ultraviolet rays and light and should be used in such an amount that initiation of the radical polymerization of the unsaturated polyester be the action of ultraviolet rays may not be disturbed.

The paint for the middle or top coat which comprises the above mentioned various ingredients may directly be applied as such onto the metal film but is preferably dissolved or dispersed in a proper inert solvent or a thinner as vehicle, prior to application onto the metal film. In case the paint is applied in the form of a solution or dispersion in such inert solvent onto the metal film, the plastic article having on the surface thereof the metal film coated with the paint should be dried or half-dried prior to being subjected to heating or irradiation of ultraviolet rays. The solvent can freely be selected according to the sorts of materials used in the paints. In general, such solvent should be free of any functional group capable of reacting with free isocyanate group. One or more of aromatic hydrocarbons, ketones and esters such as benzene, toluene, ethylbenzene, methyl ethyl ketone, methyl isobutyl ketone, ethyl acetate and butyl acetate are used as good solvent (vehicle) for this process. Water and alcohols such as isopropanol and butanol having reactive hydrogen atoms cannot in principle be used as solvent for the paint but may be used in a small amount in place of a part of the inert solvent.

Plastic substances as substrate of the product of this invention, i.e. molded plastic articles having a metal film on the surface thereof, are not limited only to thermoplastic resins. The substrate of the product may be thermocuring resins, rubbery plastics such as hard rubber, wood-incorporated plastics and a combination of these materials, so far as they have a metal film on the surface thereof.

The molded plastic articles of the present invention having on the surface thereof a thin metal film coated with a combination of the specific protective layers are excellent in resisting properties, especially in abrasion-resisting and weather-resisting properties as compared with similar products obtained according to the known conventional methods wherein a molded plastic article having on the surface thereof a metal film formed by means of vacuum evaporation is coated with a single top coat of a conventional chemical composition.

The process of the present invention is particularly suitable for protecting molded plastic articles having on the surface thereof a corrosive metal film or a very thin metal film obtained by means of the various types of vacuum evaporation.

Because of very excellent weather-resisting and abrasion-resisting properties, the molded plastic articles of the present invention can advantageously be used as plastic articles of metallic feeling for various indoor and outdoor applications, for example, as interior goods or ornaments, parts of automobiles, outdoor ornaments and various kinds of signborards including door plastes and road signs.

The present invention is especially valuable in making it possible for the first time to use molded plastic articles having on the surface thereof a thin metal film obtained, for example, by means of vacuum evaporation for various kinds of outdoor applications exposed under severe weathering and abrasive conditions.

In fact, the molded plastic articles of the present invention are tolerant to lugged uses and maintain beautiful metallic appearance even after the lapse of a long period of time, irrespective of whether they are employed as indoor objects or outdoor objects.

The present invention will now be illustrated in more detail by way of examples wherein all the part are by weight.

EXAMPLE 1

A linseed oil-modified paint was applied as base coat onto the surface of a molded plastic article made of ABS resin until the thickness of the base coat became 10 μ. The base coat was dried and cured at 70° C for 60 minutes. Aluminum metal was then applied onto the surface of the base coat by means of vacuum evaporation so as to form an aluminum film of 0.2–0.8 μ in thickness. A paint consising of 100 parts of methyl methacrylic polyesterpolyol having a hydroxyl number of 50, 25 parts of hexamethylene diisocyanate, 7 wt.% of an UV-absorbing agent of the general formula (1), 2.0 parts of ethylbenzene, 20 parts of methyl ethyl ketone and 40 parts of methyl isobutyl ketone was applied as middle coat onto the aluminum film until the thickness of the middle coat became 10 μ. The coated article was then heated at 80° C for 60 minutes to effect curing of the intermediate coat. A paint consisting of 40 parts of hexamethylene diisocyanate, 100 parts of an unsaturated polyester of fumaric acid series containing 0.5% by weight of benzoin methyl ether, 50 parts of styrene, 10 parts of methyl ethyl ketone, 10 parts of isopropyl alcohol and 30 parts of methyl isobutyl ketone was applied as top coat onto the cured middle coat until the thickness of the top coat became 20 μ. The coated article was finally irradiated for 45 seconds with ultraviolet rays having an intensity of 600 $W/m^2$ to effect curing of the top coat. A combination of the protective layers was thus formed on the surface of the alumnum film.

The performance of the protective layers thus obtained is shown in the following table parallelly with that of a conventional protective layer given for the purpose of comparison.

TABLE

| Test item | Test conditions | | The conventional product | The product of this invention |
|---|---|---|---|---|
| Pencil hardness | Hardness of the protective coat examined by scratching it with a pencil of a definite hardness* | | HB | 2H |
| Weather-resisting property | Sunshine weather-o-meter | 100 Hours | Transparency lost, opacified | No change |
| | | 600 Hours | — | " |
| Abrasion-resisting property | A Ford (reciprocally moving) abrasion tester (load: 700 g; contact surface: cotton sailcloth) | 10000 cycles | Substrate emerged | " |
| | | 200000 cycles | — | " |
| Heat-resisting property | In a constant temperature bath at 80° C | 1 Hour | Opacified | " |
| | | 1000 Hours | — | " |
| Warm water-resisting property | Water passed through an ion-exchange resin (40° C) | 50 Hours | Opacified | " |
| | | 600 Hours | — | " |
| Alkali-resisting property | A 0.1-N aqueous solution of NaOH (at room temperature) | 1 Hour | Opacified | " |
| | | 600 Hours | — | " |
| Moisture-resisting property | At 40° C, 95% Humidity | 10 Hours | Opacified | " |
| | | 600 Hours | — | " |
| Acid-resisting property | A 0.1-N aqueous solution of $H_2SO_4$ (at room temperature) | 1 Hour | Opacified | " |
| | | 10 Hours | — | " |

*Measured by a pencil hardness tester

As is evident from the table, the product of the present invention wherein the aluminum film is coated with a combination of the specific protective layers is very excellent in various resisting properties such as weather-resisting property, heat-resisting property, abrasion-resisting property, warm water-resisting property, alkali-resisting property, acid-resisting property and moisture-resisting property, as compared with the similar conventional product. Especially a result of the test for examining the weather-resisting property with a sunshine weather-o-meter revealed that the conventional product was opacified and lost its transparency after the lapse of 100 hours, while the product of the present invention showed no change in appearance even after the lapse of 600 hours. In a cross-cut adhesion test for evaluationg cohesiveness, the product of the present invention showed a result of 0/100. Namely, the protective layers were never peeled off from the metal film. In a test for examining the abrasion-resisting property, the top coat and the metal film of the conventional product were all worn out below 10000 cycles. Contrary to this, the protective layers of the product of this invention were not damaged even after 20000 cycles so that the aluminum film was not influenced by abrasion.

The results of these tests obviously demonstrate superiority of the product of the present invention in various useful properties to the conventional product.

The same experiment as described above was repeated except that a tin was applied onto the base coat according to the same vacuum evaporation so as to form a tin film of 0.05–0.08 μ (about 15–25 $ug/cm^2$) in thickness. A molded ABS resin article having on the surface thereof a beautiful tin film coated with a combination of the specific protective layers was obtained. In a test for examining the weather-resisting property of this article with a sunshine weather-o-meter, no change was observed in this article even after the lapse of 700 hours, thus demonstrating very excellent weather-resisting property.

EXAMPLE 2

This example illustrates the alternative variant of the process of the present invention. A paint consisting of 100 parts of methyl methacrylic polyol having a hydroxyl number of 30, 25 parts of hexamethylene diisocyanate and a thinner in an amount sufficient to dissolve the polyester and the polyisocyanate was applied as base coat onto a molded plastic article made of AS resin until the thickness of the base coat became 10 μ. The base coat was cured at 80° C for 90 minutes. Metallic antimony was then applied onto the base coat by means of vacuum evaporation so as to form an antimony film of 0.2–0.8 μ in thickness. A paint consisting of 100 parts of methyl methacrylic polyol having a hydroxyl number of 50, 40 parts of xylylene diisocyanate, 100 parts of an unsaturated polyester of fumaric acid series containing 0.5% by weight of benzoin methyl ether, 25 parts of styrene, 25 parts of ethylbenzene, 30 parts of methyl isobutyl ketone and 20 parts of ethyl acetate was applied as middle coat onto the antimony film until the thickness of the middle coat became 10 μ. The coated article was then irradiated for 90 seconds with ultraviolet rays having an intensity of 400 $W/m^2$ to effect curing the middle coat. A paint consisting of 100 parts of methyl methacrylic polyol having a hydroxyl number of 25, 25 parts of hexamethylene diisocyanate, 7% by weight of 2-(2'-hydroxy-3',5'-di-tert-butylphenyl)-5-chlorobenzotriazole ("Tinuvin 327" CibaGeigy), 100 parts of ethylbenzene, 80 parts of methyl isobutyl ketone, 40 parts of ethyl acetate and 40 parts of methyl ethyl ketone was applied as top coat onto the surface of the middle coat until the thickness of the top coat became 20 μ. The top coat was then cured by heating it at 80° C for 90 minutes. In appearance, the product thus obtained has a slightly blackish lustrous silver surface with a heavy metallic feeling. This product was especially excellent in weather-resisting property.

It is understood that the preceding representative examples may be varied within the scope of the present specification, both as to the reactants and reaction conditions, by one skilled in the art to achieve essentially the same results.

As many apparently widely different embodiments of this invention may be made without departing from the spirit and scope thereof, it is to be understood that this invention is not limited to the specific embodiments thereof escept as defined in the appended claims.

What is claimed is:

1. A molded plastic article having on the surface thereof a metal film coated with the following protective layers in any order of (a) a layer applied from a mixture consisting essentially per 100 parts by weight of an acrylic copolymer of a lower alkyl ester of acrylic or methacrylic acid and a lower hydroxyalkyl ester of acrylic or methacrylic acid and having a hydroxyl number of 10–150, 10–150 parts by weight of an anti-yellowing polyisocyanate and 2–10 parts by weight of an ultraviolet ray-absorbing agent and cured by heating and (b) a layer consisting essentially of an unsaturated polyester and about 10–80 parts by weight of an anti-yellowing polyisocyanate per 100 parts of said unsaturated polyester, which layer is curable by the action of ultraviolet rays and then cured by exposure to such rays.

2. A molded plastic article according to claim 1 wherein the thickness of each of said protective layers is within a range of 5–60 μ.

3. A molded plastic article according to claim 1 wherein said acrylic copolymer is a copolymer of a lower alkyl acrylate or a lower alkyl methacrylate, and a lower hydroxyalkyl acrylate, or a lower hydroxyalkyl methacrylate, the proportion of said lower alkyl ester to said lower hydroxyalkyl ester being 7:1 to 20:1.

4. A molded plastic article according to claim 1 wherein said anti-yellowing polyisocyanate is one selected from the group consisting of aliphatic diisocyanates and araliphatic diisocyanates.

5. A mold plastic article according to claim 1 wherein said ultraviolet ray-absorbing agent has a hydroxy group.

6. A molded plastic article according to claim 1 wherein said composition curable by the action of ultraviolet rays is a polymer of an unsaturated polyester.

7. A molded plastic article according to claim 6 wherein said unsaturated polyester is a polycondensate of an unsaturated polycarboxylic acid with an alkylene glycol.

8. A molded plastic article according to claim 1 wherein said molded plastic article comprises a thermoplastic resin substrate carrying a metallic film coated with said protective layers.

* * * * *